(12) United States Patent
Symchuk (10) Patent No.: US 9,932,799 B2
(45) Date of Patent: Apr. 3, 2018

(54) TRACTOR AND HIGH PRESSURE NITROGEN PUMPING UNIT

(71) Applicant: Michael Kenneth Symchuk, Calgary (CA)

(72) Inventor: Michael Kenneth Symchuk, Calgary (CA)

(73) Assignee: CANADIAN OILFIELD CRYOGENICS INC., Nisku (CA)

( * ) Notice: Subject to any disclaimer, the term of this patent is extended or adjusted under 35 U.S.C. 154(b) by 0 days.

(21) Appl. No.: 14/717,730

(22) Filed: May 20, 2015

(65) Prior Publication Data

US 2016/0341007 A1  Nov. 24, 2016

(51) Int. Cl.
*E21B 41/00* (2006.01)
*F17C 9/02* (2006.01)

(52) U.S. Cl.
CPC ............... *E21B 41/00* (2013.01); *F17C 9/02* (2013.01)

(58) Field of Classification Search
CPC ........ F01N 5/02; F01N 2240/02; F01N 3/043; F01N 13/14; F01N 2270/02; F01P 2060/16; Y02T 10/16
USPC .................................. 60/285, 286, 320, 287
See application file for complete search history.

(56) References Cited

U.S. PATENT DOCUMENTS

| | | |
|---|---|---|
| 2,937,504 A | 5/1960 | Riediger |
| 2,940,268 A | 5/1960 | Riediger |
| 3,018,634 A | 1/1962 | Gilmore |
| 3,100,528 A | 8/1963 | Plummer et al. |
| 3,068,659 A | 7/1966 | Marshall, Jr. |
| 4,197,712 A | 4/1980 | Zwick et al. |
| 4,438,729 A | 3/1984 | Loesch et al. |
| 4,458,633 A | 7/1984 | Loesch et al. |
| 4,599,868 A * | 7/1986 | Lutjens ................... F17C 9/02 237/12.3 B |
| 4,738,115 A | 4/1988 | Goode |
| 5,095,709 A | 3/1992 | Billiot |
| 5,190,249 A | 3/1993 | Whitmire et al. |
| 5,656,136 A * | 8/1997 | Gayaut .................. E21B 36/00 166/302 |
| 5,988,280 A * | 11/1999 | Crawford ............... E21B 43/25 166/303 |
| 5,990,052 A | 11/1999 | Harris |
| 6,032,732 A | 3/2000 | Yewell |
| 6,073,695 A | 6/2000 | Crawford et al. |
| 6,095,240 A * | 8/2000 | Hassanein ............. F28D 7/0066 165/140 |
| 6,345,508 B1 | 2/2002 | Bodhaine et al. |

(Continued)

*Primary Examiner* — Patrick Maines
(74) *Attorney, Agent, or Firm* — Ramon L. Pizarro (57) ABSTRACT

A system using a semi-tractor and the engine of the semi-tractor to heat a fluid from a cryogenic temperature to approximately room temperature while pressurizing the fluid is disclosed. The system is mounted on the frame of the semi-tractor and preserves the ability of the semi-tractor to haul a standard semi-trailer tanker. The system uses a semi-tractor having an internal combustion engine cooled by a liquid coolant, a cab with a sleeper section. The sleeper section is used as a control cabin for allowing an operator to monitor the operation of the system in the field. The frame includes a fifth wheel type coupler that is mounted forward of the rearmost wheel axle of the semi-tractor.

1 Claim, 9 Drawing Sheets

(56) References Cited

U.S. PATENT DOCUMENTS

| | | | |
|---|---|---|---|
| 6,415,866 B1* | 7/2002 | Baugh | E21B 36/00 166/304 |
| 6,981,850 B1* | 1/2006 | Maltbie | F22B 1/18 417/201 |
| 7,694,731 B2 | 4/2010 | Decker | |
| 8,371,251 B2 | 2/2013 | Frick | |
| 9,347,303 B2* | 5/2016 | Horst | E21B 43/34 |
| 2006/0260331 A1 | 11/2006 | Andreychuck | |
| 2007/0214804 A1 | 9/2007 | Hannan et al. | |
| 2009/0151927 A1 | 6/2009 | Crawford | |
| 2011/0005757 A1* | 1/2011 | Hebert | E21B 36/006 166/302 |
| 2011/0297353 A1* | 12/2011 | Stegeman | F28D 15/00 165/104.19 |
| 2012/0234024 A1 | 9/2012 | Street et al. | |
| 2013/0026431 A1* | 1/2013 | Uemura | B66C 23/44 254/325 |
| 2013/0205755 A1 | 8/2013 | Casadei et al. | |
| 2013/0284817 A1* | 10/2013 | Welle | F24H 1/06 237/12.1 |
| 2013/0299159 A1 | 11/2013 | O'Rourke et al. | |
| 2013/0341010 A1 | 12/2013 | Nevison | |
| 2014/0048268 A1 | 2/2014 | Chandler | |
| 2014/0075964 A1 | 3/2014 | Naumovite et al. | |
| 2016/0144860 A1* | 5/2016 | Naito | F16H 61/02 475/127 |

* cited by examiner

Fig. 2B
(CONTINUED FROM Fig. 2A)

FIG. 3
(PLAN VIEW)

(END VIEW- LOOKING FWD)

Fig. 8
(PASSENGER SIDE VIEW)

TRACTOR AND HIGH PRESSURE NITROGEN PUMPING UNIT

BACKGROUND OF THE INVENTION (a) Field of the Invention

This application relates to a system for transporting cryogenic and then superheating the cryogenic fluids at an oil or gas well site or facility. More specifically, but not by way of limitation, to a self-contained tractor and cryogenic fluid vaporization and pressurization system that cooperates with standard tanker trailers for hauling a standard tanker trailer to a well site and provide fracturing fluids for use in fracturing, well servicing, and nitrogen purging.

(b) Discussion of Known Art

The preparation of fracturing fluids is well known. An example of fracturing fluid formulation is provided in U.S. Pat. No. 5,551,516, to Norman et al., which is incorporated herein by reference in its entirety. Although other fluids may be used, a common important component of fracturing fluids is nitrogen, which is used gaseous form to create a foamed fracturing fluid. The foaming of the fracturing fluid provides beneficial mechanical properties to the fracturing fluid, and commonly used gasses to create a foamed fracturing fluid include as air, nitrogen or carbon dioxide. Air, nitrogen or carbon dioxide can each be used by itself as the fracturing fluid, but these gasses are typically combined with other fluids, such as water, in liquid a state, and proppants, to create fracturing foam or fluid (collectively referred to from here forward as simply a "fracturing fluid". The fracturing fluid is pressurized and delivered through a steel casing that has been inserted in a well bore to a desired location in the well bore. The fracturing fluid is delivered to the desired location at high pressures of 10,000 PSI or greater in order to fracture underground formations in order to create flow passages for any valuable oil or gas deposits that may be found near the well bore.

Since well bores, and their associated casing can extend miles from the drilling rig, the amount of fracturing fluid that must be delivered into the ground to fracture the underlying geological formations can be very large. Thus, the amount of gas used for foaming fracturing fluid also correspondingly large. Accordingly, it is advantageous to haul at one time as much of the substance or compound that is to be used to create the gas for foaming.

As discussed above, nitrogen is commonly used as the gas for foaming the fracturing fluid. A benefit of nitrogen is its abundance and low cost, due to the fact that nitrogen is a major component of air. However, nitrogen must first be separated from other components of air and then be cooled to temperatures that cause nitrogen to enter a liquid state. The cooling of the nitrogen to a liquid state is needed due to the large amount of nitrogen used for the fracturing fluids at the well site. It is well known that transportation of these large amounts of nitrogen is most economically accomplished by transporting the nitrogen in a liquid state.

The equipment and facilities needed for separating and liquefying nitrogen, or other fluids that are to be later expanded in the field to serve as components of fracturing fluids, are large and expensive. Thus these facilities are built as permanent or semi-permanent, centralized, facilities that serve as the hubs for preparation of these fluids. The fluids must then be transported from these facilities to the well site, where they are then heated into a gas, which is then used as a component of the fracturing fluid.

The liquefaction of nitrogen requires that the nitrogen be cooled to what is commonly considered cryogenic temperatures. However, to be useful as a component of fracturing fluid, the liquid nitrogen must be re-heated to a superheated state where the nitrogen is in a gaseous state. Nitrogen must be in a superheated state before it can be used as a gaseous component of fracturing fluid. Typically, this requires heating the liquid nitrogen from about −320° F. (−196° C.) to about 70° F. (+/−20° F., 7° C.). Additionally, since the nitrogen gas must be continuously delivered in appropriate amounts to the fracturing fluid as it is delivered into the well bore; it is essential that the system being used to superheat the nitrogen be capable of transferring great amounts of heat energy to the nitrogen as it is being warmed from cryogenic state to what is essentially room temperature.

The problem of heating the nitrogen is complicated by the fact that nitrogen transitions into a gaseous phase at about −320° F. (−196° C.), and the heat transfer coefficient of nitrogen is reduced dramatically once it enters a gaseous phase. Accordingly, raising the temperature of nitrogen gas requires significantly more heat-transfer surface area and time. Because of this reduced efficiency in the superheating of nitrogen, known systems for gasification of nitrogen are typically quite large. Importantly, the size of known systems require a dedicated truck or skid, which means that fracturing operations require vehicles that are dedicated for transporting the nitrogen itself and separate vehicles/systems for heating the nitrogen to a state and temperature that allows the nitrogen to be useful as a component of fracturing fluid.

Examples of known systems for heating nitrogen for the purpose of using the nitrogen as a component of fracturing fluid include U.S. Pat. No. 4,738,115 to Goode, incorporated herein by reference, and U.S. Pat. No. 4,458,633 to Loesch, also incorporated herein by reference. U.S. Pat. No. 4,599,868 to Lutjens et al., also incorporated herein by reference. Additionally, it is known that coolant from a vehicle can be used for heating a fluid that is to be delivered to a well bore. For example, U.S. Pat. No. 5,656,136 to Gayaut et al., incorporated herein by reference, discloses that engine coolant can be used to heat a fluid that is to be delivered to an oil well bore. However, the Gayaut et al. device suffers from the limitation that it carries the fluid to be heated in reservoir tanks that are a permanent component of the vehicle-mounted system. Thus, the system service time is limited by the capacity of the system's reservoir tanks.

Other systems, such as the system disclosed in U.S. Patent Application Publication No. 2014/0048268 to Chandler, disclose the use of an oil-fired heater that is mounted on a trailer that also includes a heat exchanger system for heating an inert gas that will then be used for fracturing. The Chandler device is mounted on a trailer that is dedicated to the heating system. Thus, the heating system must be hauled to a well site using a semi-tractor or other tow vehicle, and then left at a specific location, next to the well. An important limitation of this type of system is that a semi-tractor must be sent to the drilling site to pick up and move the system to a new location. This results in an inefficient use of equipment, due to the fact that a semi-tractor must be separately dispatched to well site every time the system needs to be moved. Additionally, since the Chandler device does not have its own reservoir of inert gas/fluid, a separate tanker trailer must also be left at the drill site.

Accordingly, a review of known devices reveals that there remains a need for an efficient system that serves to superheat gases for fracturing, such as nitrogen gas, carbon dioxide, or other known fluids or gases used as components of fracturing fluids. More particularly, there remains a need for a heating system that obviates the need to have a semi-tractor for towing the fracturing fluid to the drill site and another semi-tractor for towing the heating and gas pressurization system used for providing superheated gas to fracturing fluid.

Still further, there remains a need for a fracturing gas heating and pressurization system that can be installed on a semi-tractor, which can then be used to haul a standard sized tanker trailer.

There remains a need for a fracturing gas heating and pressurization system that can haul a standard sized tanker trailer and use the fluid from the standard sized tanker trailer to create high-pressure, superheated gas that is ready for use as a component of fracturing fluid.

Still further, there remains a need for a fracturing gas heating and pressurization system that can be retrofitted onto a standard semi-tractor, and preferably onto a semi-tractor with a sleeper cab. The use of a semi-tractor with an integral a sleeper cab allows the use of the conversion of the sleeper cab into a "control cabin", which protects the monitoring equipment and the operator from the elements.

SUMMARY

It has been discovered that the problems left unanswered by known art can be solved by providing a method and system for adapting a semi-tractor to allow the semi-tractor to heat a fluid from a cryogenic temperature to approximately room temperature while pressurizing the fluid, and while preserving the ability of the semi-tractor to haul a standard semi-trailer tanker. The system uses a semi-tractor having an internal combustion engine cooled by a liquid coolant, a cab with a sleeper section (which is converted into control cabin as disclosed here), and a frame trailer coupling adapted for accepting a semi-trailer tanker. The frame includes a fifth wheel type coupler that is mounted forward of the rearmost wheel axle of the semi-tractor. The semi-trailer tanker being adapted for transporting a cryogenic fluid such as liquefied nitrogen.

The internal combustion engine of the semi-tractor produces exhaust gases as the products of combustion, and according to a preferred embodiment of the invention, these exhaust gases are used as one of the sources of energy used to heat cryogenic fluid drawn from the semi-trailer tanker.

The frame of the semi-tractor is used to support a vaporization system for vaporizing cryogenic fluid. According to a preferred embodiment, the vaporization system uses heat drawn from the engine coolant fluid of the motor used to drive the semi-tractor. Additionally, the vaporization system will also use heat drawn from the hydraulic system that is used to flow and pressurize the nitrogen.

The disclosed system uses a heat exchanger system that includes an engine coolant heat exchanger, a hydraulic fluid heat exchanger, and an exhaust gas heat exchanger. These three heat exchangers are connected in series, with the engine coolant heat exchanger being the first heat exchanger encountered by the cryogenic fluid being vaporized. The next heat exchanger encountered by the fluid being vaporized will be the hydraulic fluid heat exchanger. The fluid being vaporized will then flow through the exhaust gas heat exchanger.

The semi-tractor's engine coolant provides an excellent source of heat at a relatively high temperature, but excessive reliance on the engine coolant as a source of heat can lead to excessive reduction in the coolant temperature, which can in turn lead to engine damage or failure. Accordingly, the disclosed vaporization system provides a monitoring system that uses a measurement of the temperature of engine coolant that is being returned to the semi-tractor's engine and then uses this engine coolant return temperature value to adjust the volume of engine coolant being delivered to the engine coolant heat exchanger. It is contemplated that exhaust gas will be diverted to the exhaust gas heat exchanger as required for pumping fracturing fluid at high rates. Additionally, the disclosed system has a diversion system that allows the system to release exhaust gases through the stock muffler system, and thus bypassing the exhaust gas heat exchanger. This is to allow for conditions when pumping at low flow rates and the heat is not required form the exhaust gases to heat the cryogenic fluid delivered to the system.

Still further, the system's hydraulic fluid system is used to provide high temperature heat to the cryogenic fluid, and thus alleviate the need to use engine coolant as a main heat source. To achieve this, the disclosed system has includes a hydraulic system that powers a triplex pump that is used to flow and pressurize the superheated nitrogen to a desired pressure for use with the fracturing fluid. Typically, the pressurization of the superheated nitrogen gas, or other suitable gas, is determined by the depth of the well bore, as well as the desired composition of the fracturing fluid, and the geophysical characteristics of the area being fractured for the purpose of extracting natural gas, oil, or other valuable hydrocarbons.

The hydraulic system of the disclosed invention has been sized to produce adequate pressurization of the nitrogen gas and to allow the hydraulic system to act as a source of high temperature heat energy. The high temperature heat energy is released when the pressure of an incompressible fluid, such as hydraulic fluid, is dropped without doing work (i.e., exerting a force over a distance) with the hydraulic system. This phenomenon is also referred to as "throttling" of the hydraulic fluid, and is discussed in U.S. Pat. No. 4,192,456 to Shields et al., incorporated herein in its entirety by reference.

Accordingly, the disclosed system will monitor the temperature of the fluid being vaporized at various stages along the heat exchangers, as well as the temperatures of the fluids used to provide heat to the fluid being vaporized. For example, the disclosed system uses these temperature measurements to prevent damage to the engine due to the use of coolant that is at too low of a temperature, or from engine overheating. When the system detects that the engine coolant is exiting the engine coolant heat exchanger at too low a temperature, then the system will either increase the load on the engine via the load pump or reduce the amount of coolant being diverted to the engine coolant heat exchanger. The reduction of coolant being diverted to the engine coolant heat exchanger will require that heat had been drawn from the engine coolant heat exchanger be made up by the either the hydraulic fluid heat exchanger and or the exhaust gas heat exchanger.

Thus the determination of how much of the required heat transfer is accomplished by any one of the three heat exchangers is determined by the temperatures of the working fluids. Accordingly, the disclosed system can vary the amount of heat transferred to the nitrogen from the engine coolant, the hydraulic fluid, and the exhaust gases by varying the amount of each of theses fluids is being diverted to the respective heat exchanger.

The control of the of the amount of heat drawn from a specific fluid can be fully automated and monitored through a control system that can be housed in the sleeper cab portion of the tractor trailer. In a preferred example of the invention, the control system is programmed into a solid state Micro Controller Unit (MCU) that is mounted from the nitrogen system. The MCU is then hardwired to a touch screen in the control cab. The touch screen allows for operator input to the system. A Remote Access Device (RAD) is connected directly to the MCU the RAD then connects wirelessly to a portable hand held device, phone or tablet. This allows the operator to operate the unit in the cab or outside of the cab at some distance away from the unit. This arrangement allows an operator to use the portable computer to observe and control specific flows, temperatures, or operating pressures of the fluids used in the system as may be needed. For example, an increase in the pressure of the heated nitrogen gas being delivered to the fracturing fluid will typically result in an increase in the hydraulic fluid temperature, due to the increased energy input into the compression of the nitrogen. The engine handles this increased load onto the hydraulic system, affects the amount of heat being transferred from the engine to the engine coolant.

The engine's cooling system will include a thermostat that will keep the engine coolant at a constant temperature. Thus, changes in the amount of heat delivered to the nitrogen will be provided primarily from the hydraulic fluid, since the temperature and flow rate of the hydraulic can be manipulated to a far greater extent than the flow rate and temperatures of the engine coolant or engine exhaust gas. In addition the exiting nitrogen temperature may be reduced by allowing non-heated, pressurized liquid nitrogen to be introduced into the exiting gas stream. This approach can be used for fine-tuning the temperate of the exiting nitrogen to maintain the 70° F. output without altering the system once it has achieved a steady state.

Thus the disclosed system will allow an operator to use the hand-held computer to monitor the temperatures of the engine coolant, hydraulic fluid, or exhaust gas, and adjust the temperature and pressure of the nitrogen being delivered to the fracturing fluid by the system from within the sleeper cab or outside the sleeper cab. The disclosed fluid flow control system is programmed to adjust the flow from a specific source (say, from the hydraulic fluid or from the engine coolant) to adjust the amount of heat being delivered to the nitrogen as it is being heated from liquid, cryogenic state, to a gas at a desired pressure and temperature.

It has been discovered that the disclosed arrangement results in a very efficient system that in turn results in a compact assembly that can fit between the cab and the fifth wheel coupling of a standard semi-tractor. This, in turn, allows the disclosed system to take advantage of the cooling system of the standard semi-tractor, as well as the semi-tractor's towing capacity, to couple standard, full-sized, tankers trailer to a semi-tractor configured as disclosed here, and provide the necessary gas component of fracturing fluid being used in a fracturing operation.

It has been discovered that the disclosed arrangement results in more efficient transport of fracturing fluid in a cryogenic state to the well site, as well as increased operating time due to the increased size of the tanker trailer that can be transported with the disclosed system. This also results in fewer runs to the plant or installation that houses systems for liquefaction of the cryogenic fluids.

It is preferred that the heating system will be mounted from a rigid equipment platform with a top plate and a raised profile around its perimeter to provide a barrier that captures any spilled nitrogen, and thus keeping spilled liquid nitrogen from coming into contact with the steel frame rails of the tractor.

It will be understood that the disclosed arrangement will allow the disclosed system to be readily removed from the semi-tractor frame, and thus allow the Nitrogen unit to be quickly mounting on another Semi tractor or similar load carrying vehicle if so desired.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
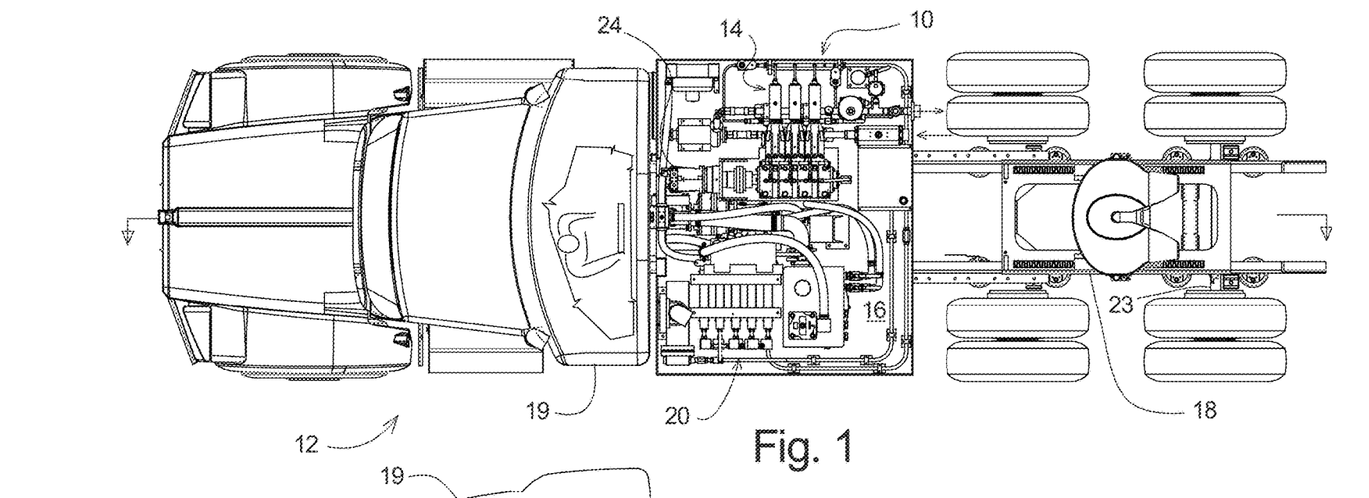
FIG. 1 is a plan view of a semi tractor that has been fitted with the disclosed system.
Figure 1A:
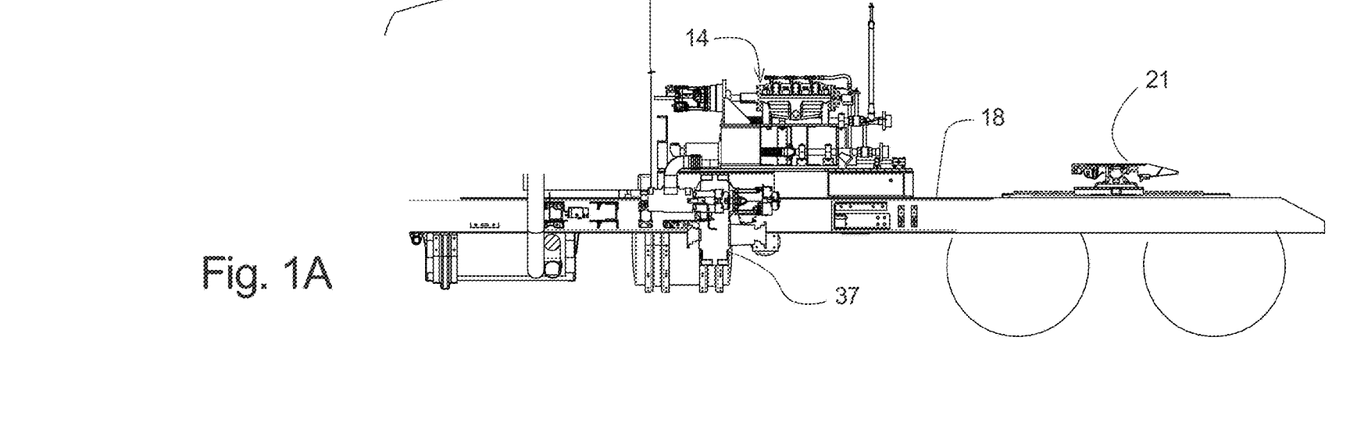
FIG. 1A is a elevation view of a semi tractor that has been fitted with the disclosed system.

Turning now to FIG. 1 where a system 10 as disclose here is shown as incorporated as part of a semi tractor 12. The system 10 allows the semi tractor 12 to be used for hauling a standard tanker trailer with fluid that is to be used to foam a fracturing fluid. Although various fluids can be heated with the disclosed system, the disclosed system is well suited for transporting and heating nitrogen from a liquid state to a gas at room temperature (approximately 70° F.). Importantly, the disclosed system is particularly well-suited for converting or retrofitting a semi tractor to allow the use of power and heat generated by engine of the semi tractor to heat liquid nitrogen stored in a tanker trailer that is connected to the semi tractor and deliver the heated nitrogen in a gaseous state at a suitable pressure to incorporate the heated nitrogen into a fracturing fluid, for the purpose of foaming the fracturing fluid as the fracturing fluid is being delivered into a well bore. In FIG. 1, the fluid at a cryogenic temperature is delivered to the system through the inlet 13 controlled by inlet valve 33, with excess fluid being returned to the cryogenic tank by return line 17 controlled by return valve 58, the system provides the heated gas though a system outlet manifold 15. As the elements of the pumps and piping must be sufficiently cold, close to −196 degrees C., the unit will go through a process generally referred to in the industry as "Cool down" this is the initial phase of pumping operations during which the Nitrogen will be vented to atmosphere during this phase the nitrogen will enter the unit at the inlet 13, with flow controlled by the inlet valve 33, and flow through the piping and centrifugal pump with the ventline valve 57 open the nitrogen will flow to the expansion silencer 52 and be released to atmosphere. The expansion silencer 52 shall allow the gas to expand and lose energy thereby reducing the noise associate with this function. Once the unit is sufficiently cooled down the and liquid nitrogen is being pumped by the Triplex pump 14, the operator has the option to allow the fluid to flow through the remote controlled high pressure recirculating valve 59 and discharge the nitrogen back to tank without allowing flow to the heat exchanger bank for heating. It should be noted that the fluid being processed with the disclosed system will be referred to herein as "cryogenic fluid" even though the fluid is not at a cryogenic temperature. The fluid that is used with the system will be of a type that is commonly transported in at cryogenic temperature, such as oxygen or nitrogen, and thus it will be referred to here as "cryogenic fluid" irrespective of the temperature of the fluid at a particular location in the disclosed system.

Figure 2A:
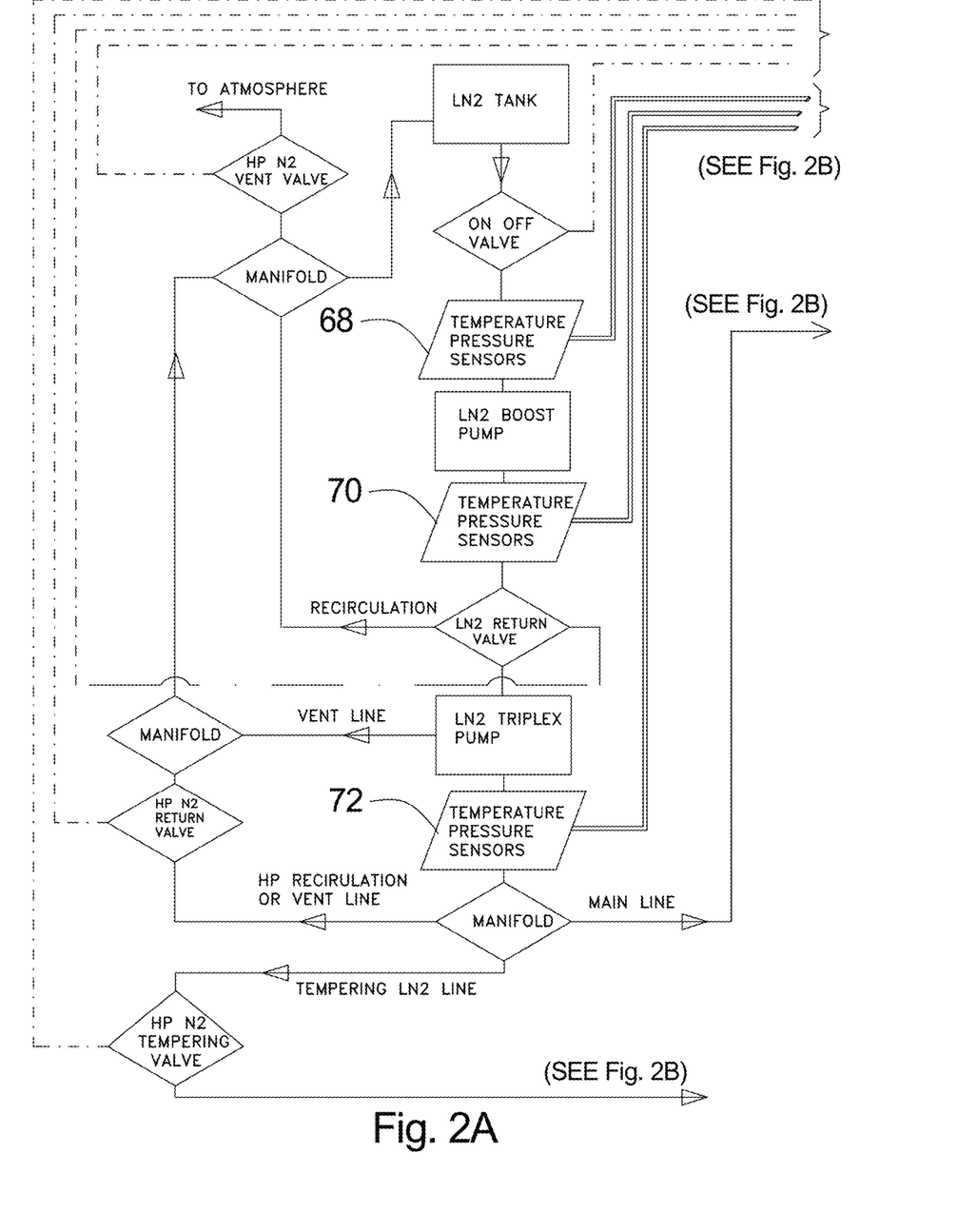
FIG. 2A is a partial flow chart showing the cooperation of various components of the disclosed system.
Figure 2B:
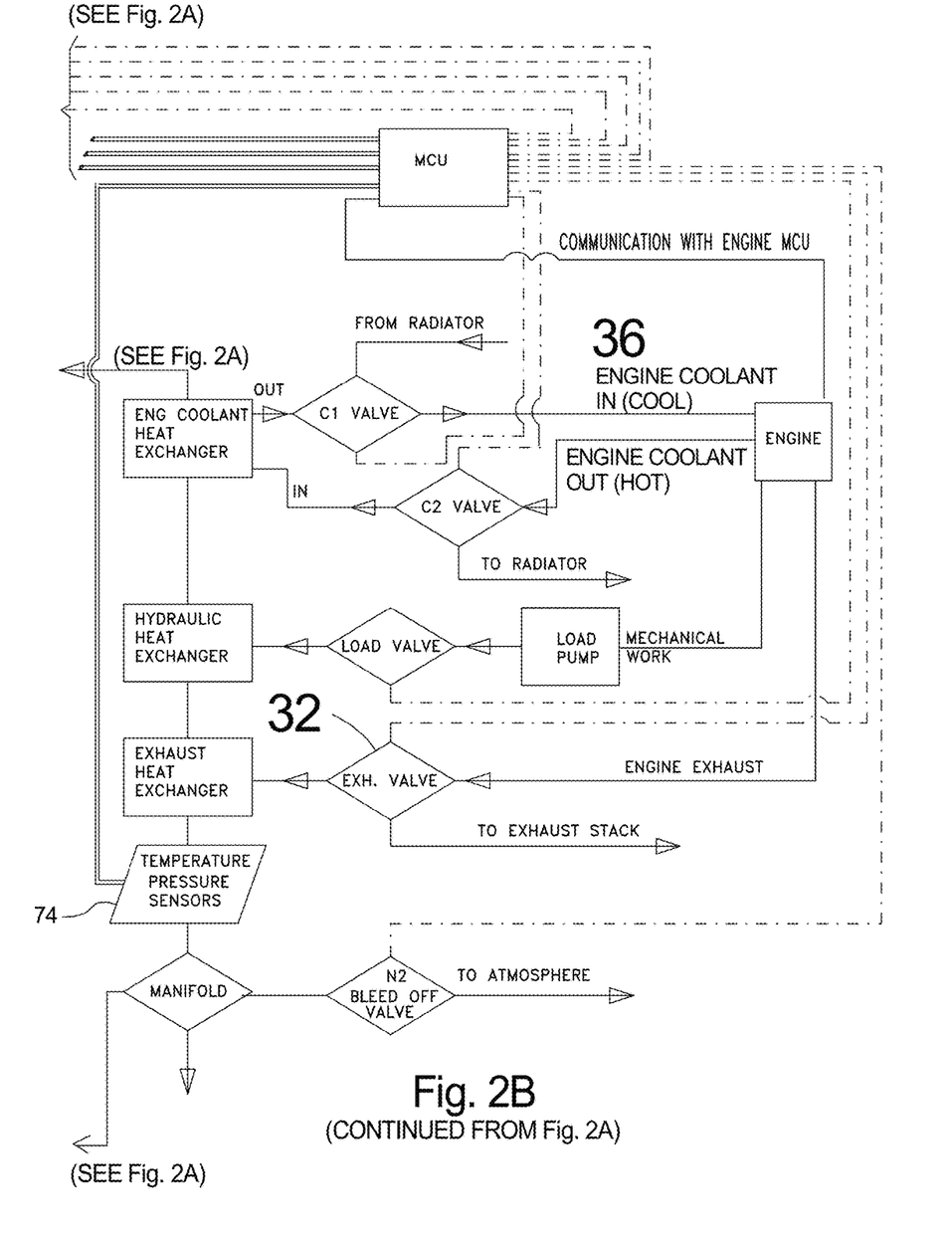
FIG. 2B is a continuation of the flow chart shown in FIG. 2A, showing the cooperation of various components of the disclosed system.
Figure 3:
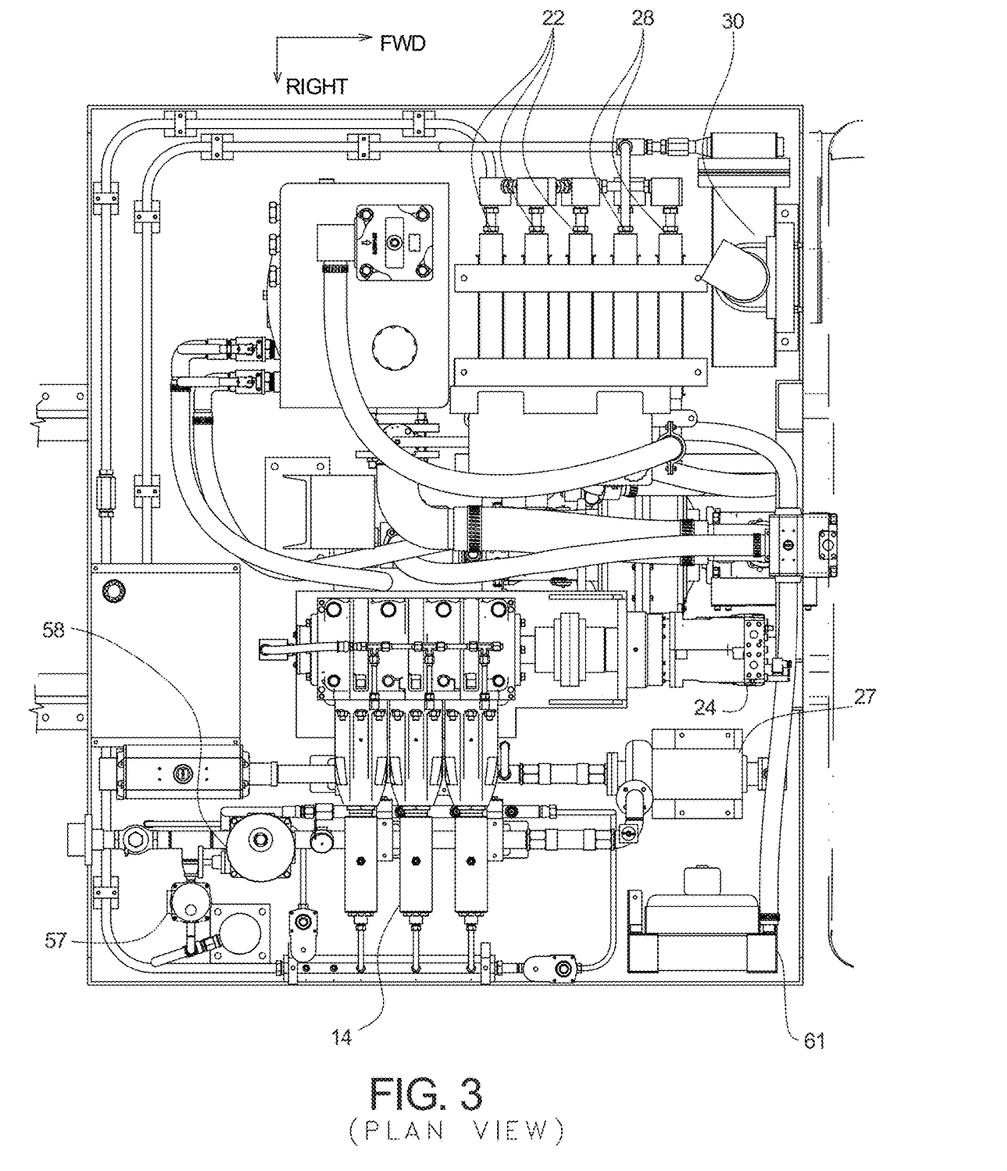
FIG. 3 is a plan view of a preferred example of the primary components of the disclosed system while mounted on the rigid platform, which is in turn mounted from the frame of a semi tractor, while preserving the hauling ability of the semi tractor.
Figure 4:
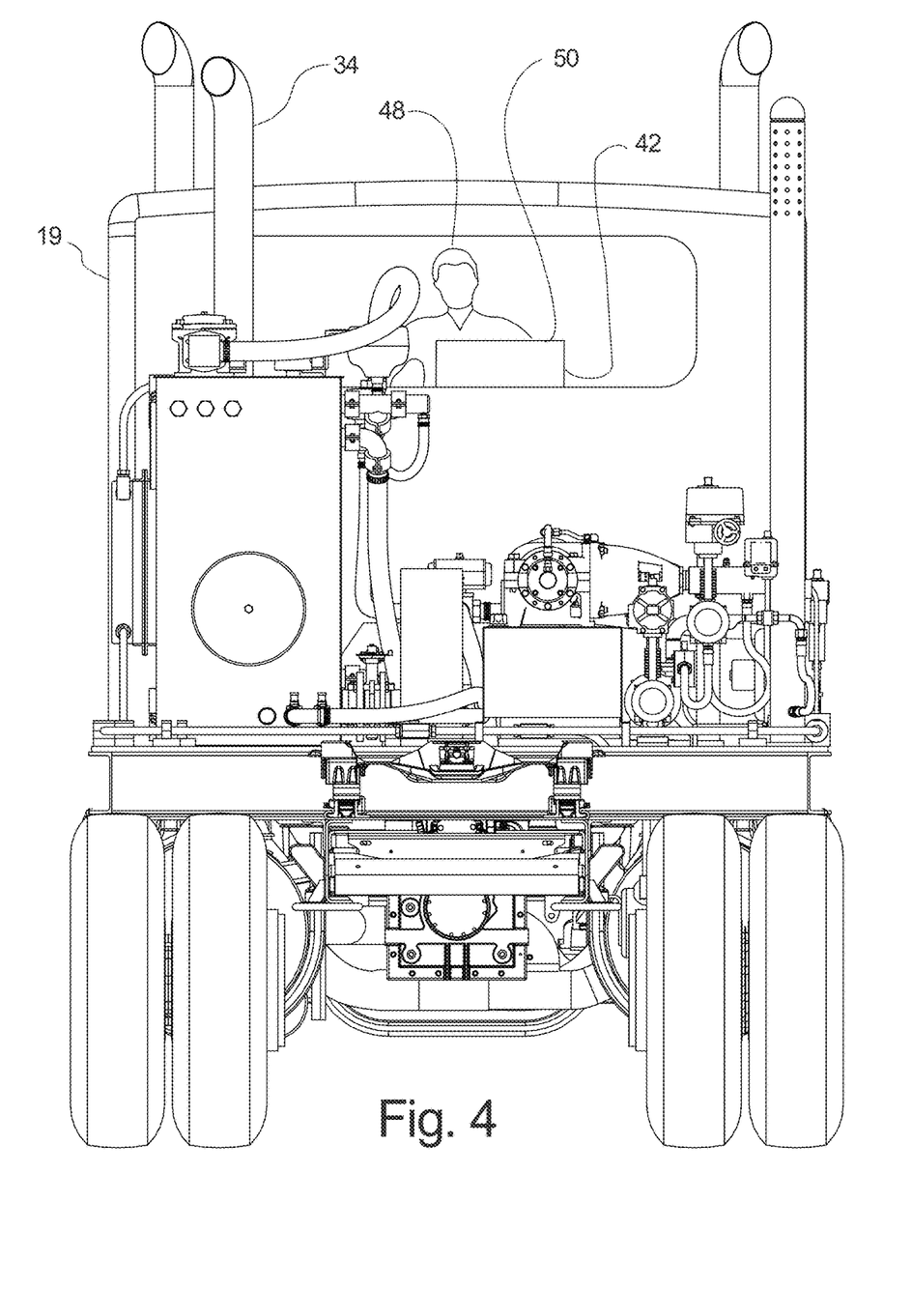
FIG. 4 is a view looking forward at a semi tractor that has been fitted with the disclosed system, and illustrating the mounting of the rigid platform from the frame of the semi tractor, as well as the power take off and other components of the disclosed system.

Turning now to FIGS. 2 and 3, it will be understood that the liquid nitrogen, at a cryogenic temperature, will be delivered from the tanker trailer to a through the inlet line 13, to the Centrifugal boost pump 27 which will increase the pressure of the Cryogenic liquid before delivering it to the triplex pump 14. Both are mounted on a rigid platform 16. The rigid platform 16 is adapted for mounting to the frame rails 18 of the semi tractor. The triplex pump 14 is used to maintain a desired pressure on the nitrogen. Additionally, the triplex pump 14 is driven by the engine of the semi tractor 12, and thus also provides a load on the engine of the semi tractor 12. The engine of the semi tractor 12 will be liquid cooled, preferably with a glycol based liquid coolant. According to a preferred embodiment of the invention, the rigid platform 16 that supports the primary components of the disclosed invention will be positioned between the cab 19 and the fifth wheel hitch 21, which is positioned between rearmost axle 23 of the semi tractor 12 and the cab 19.

The liquid coolant from the engine of the semi tractor 12 will be diverted by engine coolant diverter valves 11 from the radiator to a heat exchanger bank 20, which will include a engine glycol heat exchanger 22, which will be used to transfer heat energy from the engine liquid coolant to nitrogen delivered from the triplex pump 14 to the engine glycol exchanger 22.

Triplex pumps are commonly used for pressurizing liquids used as a component of fracturing fluids. The triplex pump 14 is driven by hydraulic fluid that is pressurized by a hydraulic pump 24 that is driven by the engine of the semi tractor 12. In a preferred example of the invention, a transfer case 37 is connected to an output shaft that is driven by the engine of the semi tractor 12. The power from the transfer case 37 is used to drive the hydraulic pump 24. It will be understood that the use of the transfer case 37, and the mounting of the hydraulic pump 24 from the rigid platform 16, offers the benefits of allowing the disclosed system to be modular, substantially self-contained, and thus easily removable from the semi tractor 12.

The hydraulic system of the disclosed invention uses the hydraulic fluid stored in the hydraulic tank 66 that is driven by the hydraulic pump 24 to power a triplex hydraulic motor 25 and in turn drive the triplex pump 14. Hydraulic fluid from the hydraulic tank 66 can also be used by a auxiliary pump 54 to drive the centrifugal pump 27 and other hydraulic valves on the unit. Additionally, the hydraulic system also includes a pressure relief valve 26 that allows the rapid reduction of hydraulic pressure along hydraulic line that is used to provide hydraulic fluid to a hydraulic heat exchanger 28, which is used to transfer heat energy from hydraulic fluid to nitrogen delivered from the engine coolant exchanger 22 to the hydraulic heat exchanger 28. As discussed above, the temperature of the hydraulic fluid can be increased by a sudden reduction of pressure. Accordingly hydraulic fluid flowing from the hydraulic tank 66 through the load pump 53 may be diverted by the diverted valve 55, from the air to oil hydraulic heat exchanger 61 to the hydraulic heat exchanger 28. This fluid from the load pump 53 would pass through the pressure relief valve 26 before entering the hydraulic heat exchanger 28, where nitrogen delivered from the engine coolant heat exchanger 22 is further heated with heat transferred from the hydraulic fluid.

It is contemplated that nitrogen exiting the hydraulic heat exchanger 28 will be at approximately the desired exit temperature of 70° F., accordingly any adjustments to the exit temperature may then be accomplished by passing the nitrogen that is exiting the hydraulic heat exchanger 28 through a exhaust gas heat exchanger 30, which uses exhaust gasses diverted from the engine's exhaust system. The exhaust gasses from the engine are diverted through the use of an exhaust diverter valve 32, and then released to the atmosphere through a system exhaust 34, which is also mounted from the rigid platform 16.

Each of the heat exchangers of the disclosed system is a counter flow heat exchanger, and heating of the liquid nitrogen in the engine coolant heat exchanger 22 where the liquid nitrogen is heated by engine coolant 36. The heating of the nitrogen promptly converts the liquid nitrogen into a vapor, which is then heated further though the heat exchanger bank 20. The disclosed system uses temperature and pressure sensors to monitor the temperature and pressure of the cryogenic fluid at various stages through out the system. As described in FIG. 2 the low pressure inlet temperature and pressure sensors 68 monitor the Cryogenic fluid as it enters the systems, the low pressure discharge temperature & pressure sensors 70 monitor the cryogenic fluid after the cryogenic centrifugal pump 27. The systems uses these inputs to ensure the fluid is a saturated state as to not provide fluid with entrained gas to the triplex pump 14. Cryogenic fluid with entrained gas is detrimental to the longevity of the triplex pump 14 as liquid with entrained gas will cause cavitation of the pump which will reduce the overall life of the triplex pump 14. The Cryogenic fluid upon leaving the triplex pump 14, flow through the triplex manifold 64 in which mounted are the high pressure triplex temperature & pressure sensors 72 enroute to the heat exchanger bank 20, once the fluid has been processed in the heat exchanger bank 20, the gas now passes the high pressure discharge temperature & pressure sensors 74 mounted in the system outlet manifold 15. The systems uses these inputs to determine the proper amount of high pressure liquid nitrogen to discharge from the tempering vale and actuator 60. The tempering valve and actuator 60 allows High pressure Cryogenic fluid to bypass the heat exchanger bank 20 thereby cooling the outlet flow to a desired temperature. This feature allows the system to be fine tuned to provide a consistent outlet temperature leveling out any system fluctuations.

Turning once again to FIG. 2, it will be understood that the disclosed system monitors the temperature of the engine coolant 36 as it enters the heat exchanger bank 20 and as the engine coolant exits the engine coolant heat exchanger 22. The coolant exit temperature 38 of the engine coolant 36 is used to control the input temperature of the hydraulic fluid being delivered to the hydraulic heat exchanger 28. The increasing the exit pressure of the hydraulic fluid as it exits the hydraulic pump 53 allows the use of the hydraulic pressure relieve valve 26 to increase the temperature of the hydraulic fluid, and thus increase the input temperature of the hydraulic fluid as it enters the hydraulic heat exchanger 28. Also, the increased load on the engine due to the increased power demand from the hydraulic load pump 53 also results in an increase in the heat transferred to the engine coolant 36, as well as the engine exhaust making more heat energy available for heating the nitrogen.

Thus it will be understood that the disclosed system overcomes problems associated with known systems that rely solely on heat collected from the engine's cooling system. Sole reliance on the engine cooling system creates a severe limitation to the capacity of the system to heat sufficient volumes of nitrogen or other gases being heated from cryogenic temperatures. In these known systems (for example the system disclosed in U.S. Pat. No. 5,656,136 to Gayaut et al.) The amount of heat energy available for heating the gas to be used as a component of a fracturing fluid is limited by the capacity of the vehicle's cooling system. The disclosed invention converts mechanical energy drawn from the power take off 37 (PTO) into heat by "throttling" the pressure of the hydraulic fluid that has been pressurized by the hydraulic load pump 53, which is driven by the engine of the semi tractor 12.

Because the disclosed system balances the amount of heat delivered from the engine coolant and the amount of heat delivered from the hydraulic system, the disclosed system uses a computerized system that adjusts the pressurization of the hydraulic fluid and the throttling of the hydraulic fluid to make up for heat that cannot be safely provided from the engine's cooling system, as operating the engine at too cold a temperature can lead to engine failure. Alternatively, relying on a thermostat to maintain the engine at a desired operating temperature will result in little heat being delivered to the engine coolant heat exchanger 22 of the heat exchanger bank 20.

Figure 5:
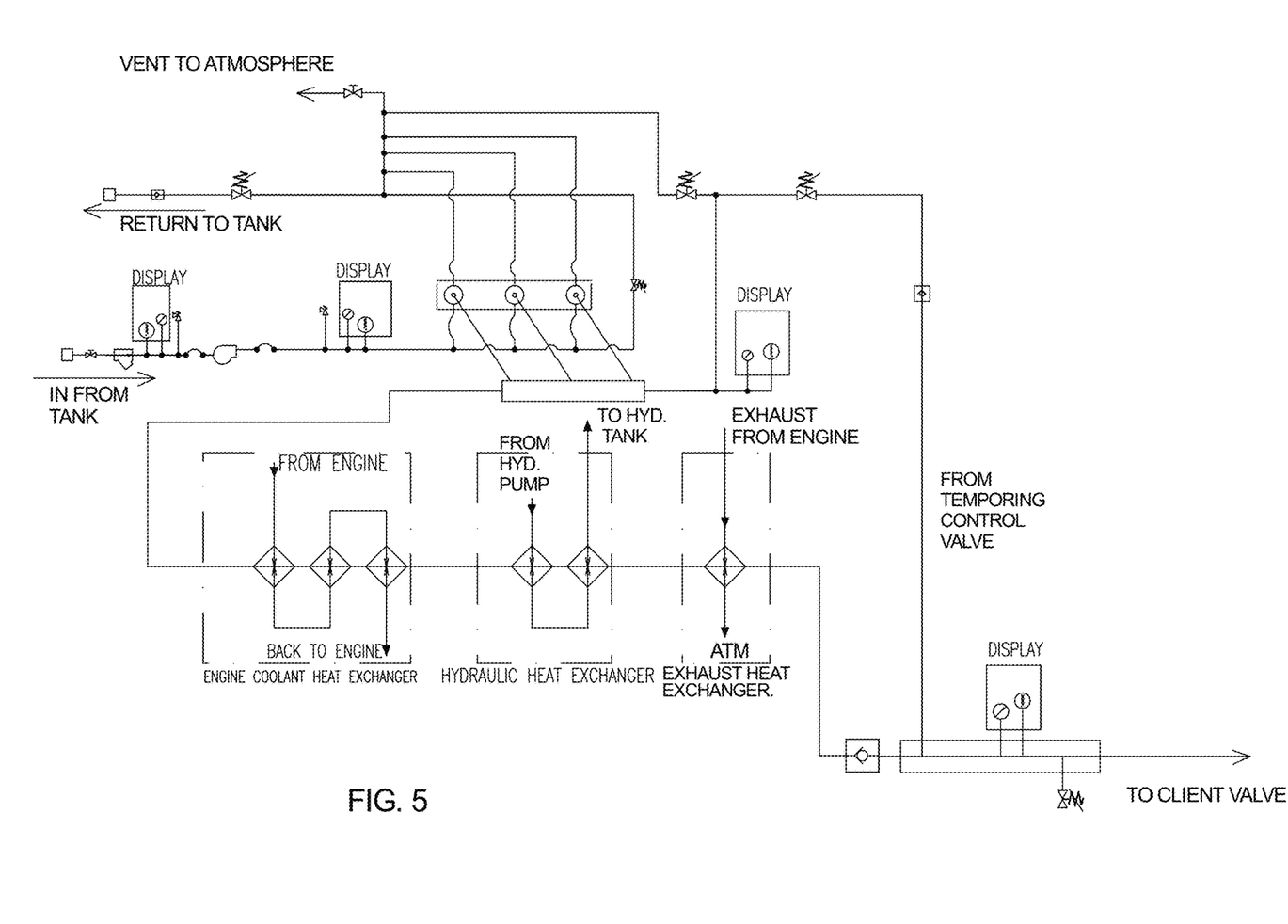
FIG. 5 is a schematic of circuitry and control systems used with a preferred example of the invention.
Figure 6:
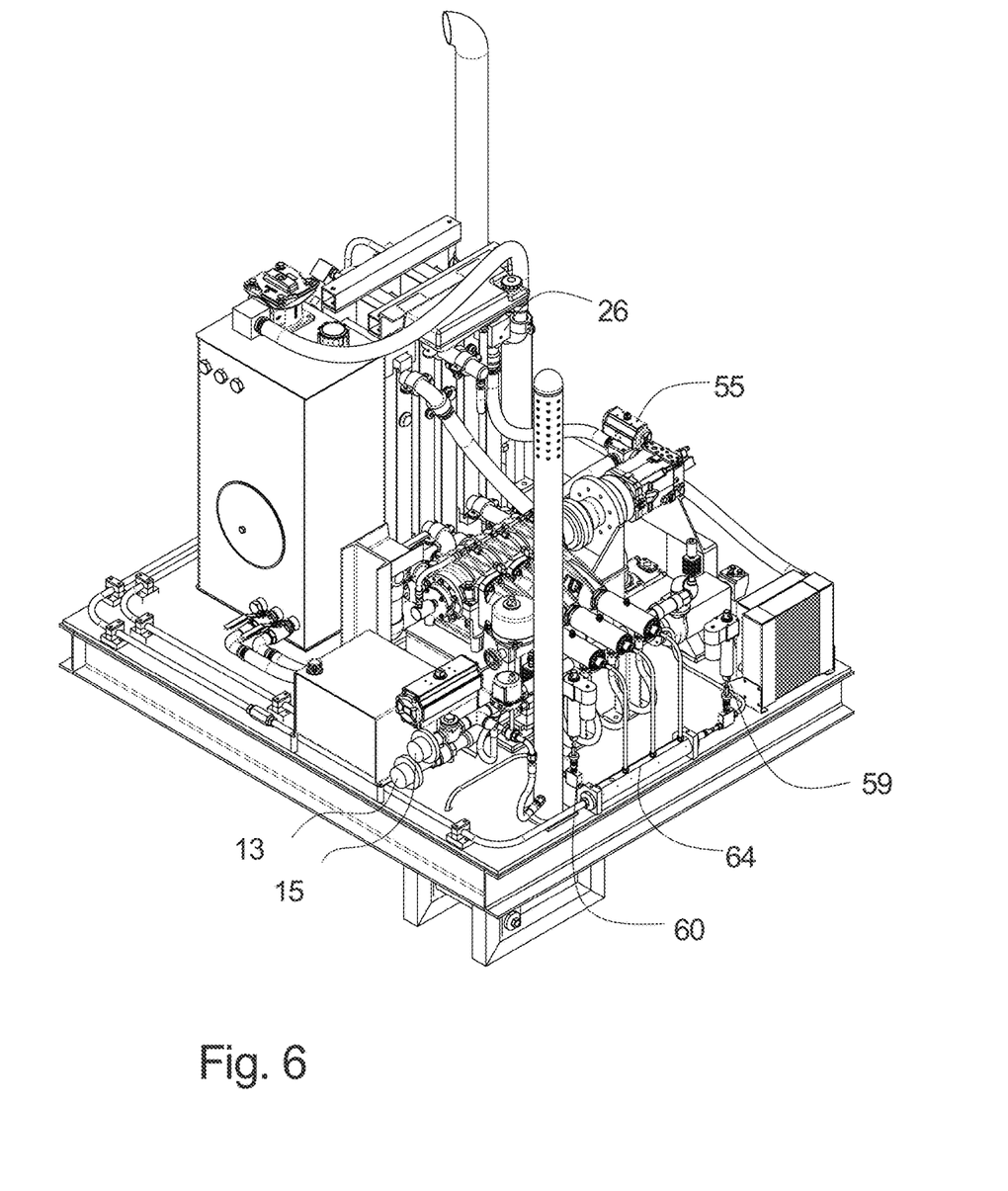
FIG. 6 is a perspective view of the disclosed invention before installation on a semi-tractor.
Figure 7:
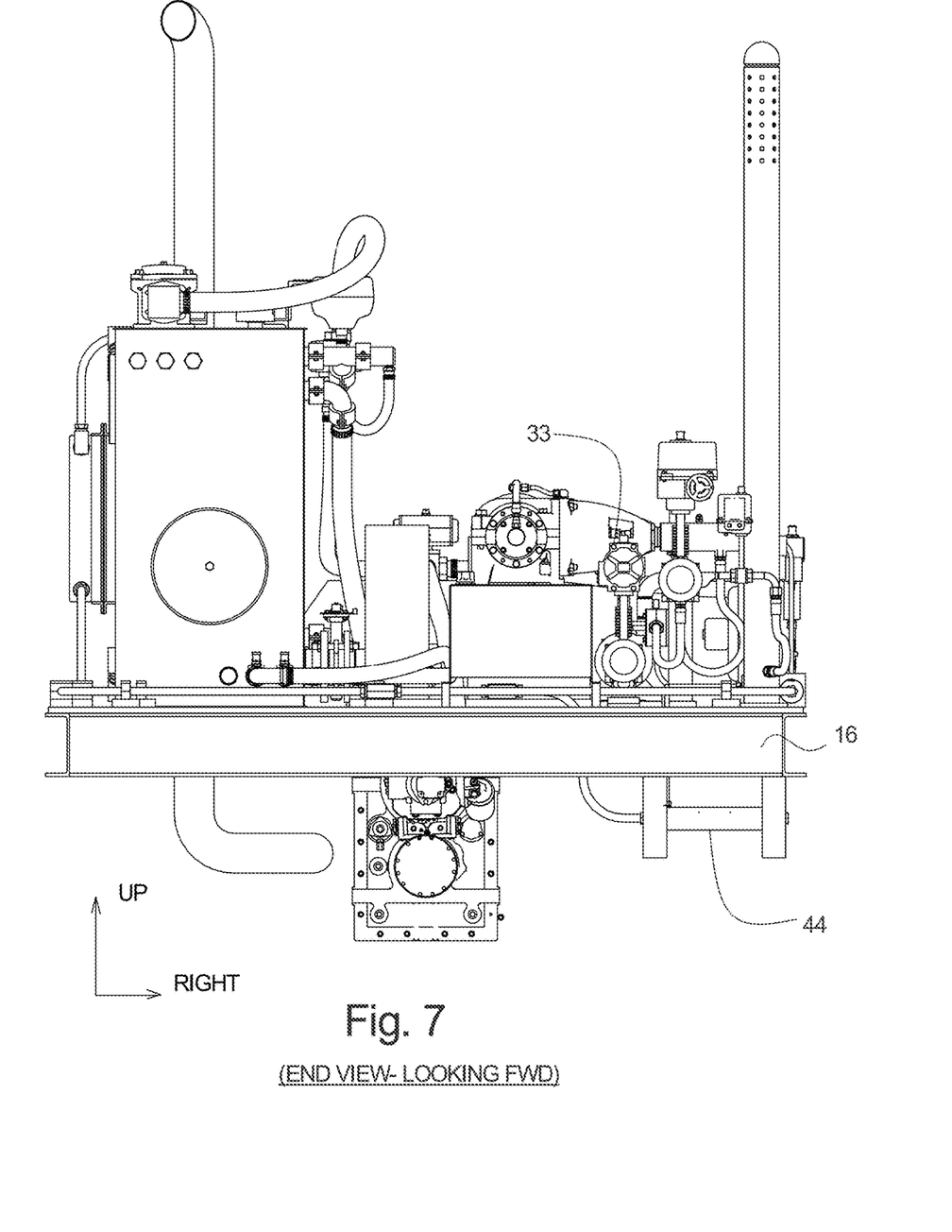
FIG. 7 is an end view, looking forward, of the disclosed invention before installation on a semi-tractor.
Figure 8:
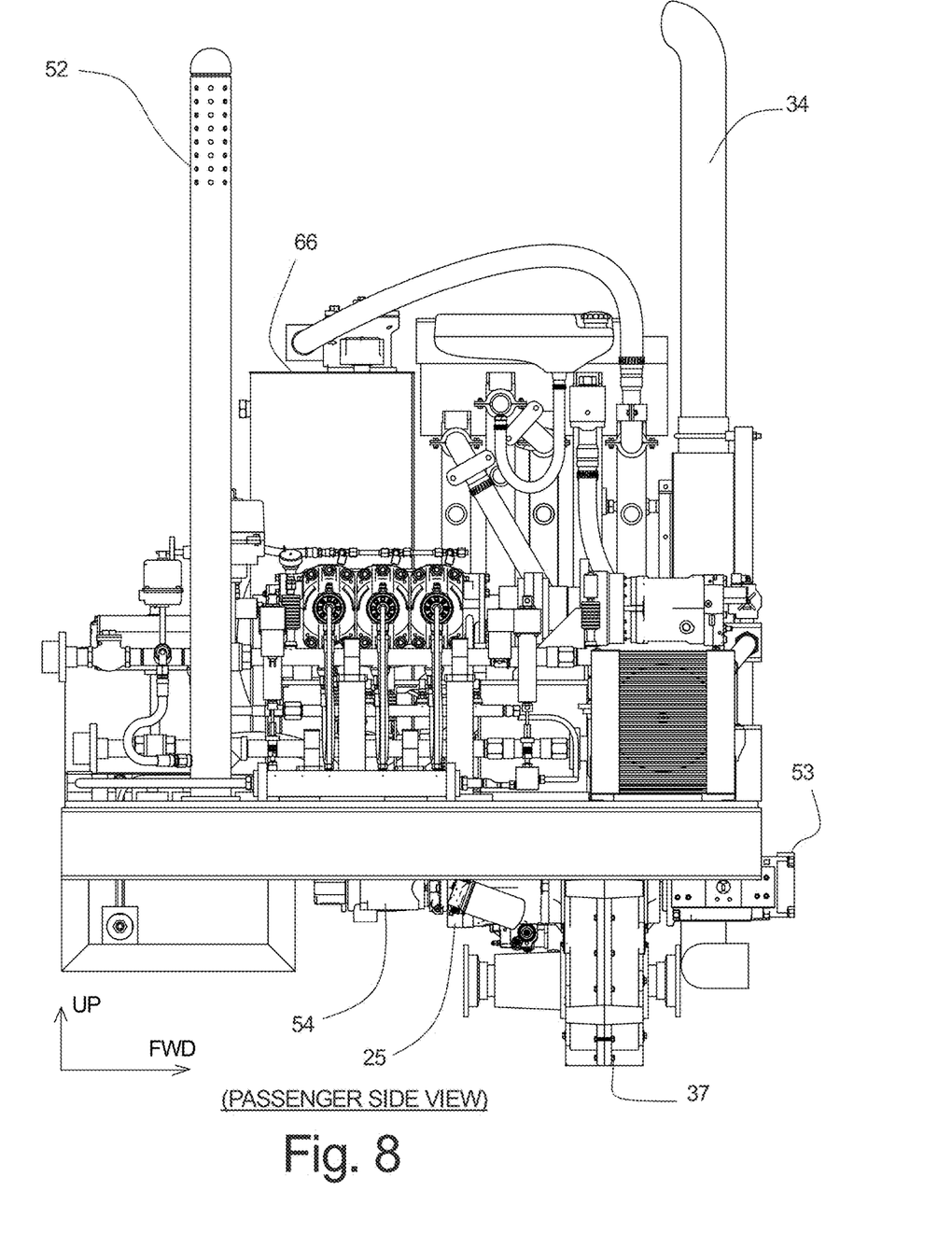
FIG. 8 is side view, looking at the passenger side, of the disclosed invention before installation on a semi-tractor.

Accordingly the disclosed system uses a computerized Micro Controller Unit (MCU) that allows control of the system through a display panel 42, such as a Touch Pad, personal computer, or other suitable display or human machine interface (HMI) system. The MCU is programmed to collect the coolant exit temperature 38, the hydraulic fluid return temperature 40, and the temperature of the nitrogen as it exits the system outlet manifold 15. The system outlet manifold 15 accepts heated nitrogen from the triplex pump 14, delivered from the heat exchanger bank 20 to, in-turn, deliver nitrogen gas to the system outlet manifold. The system outlet manifold 15 delivers the superheated nitrogen gas at a desired temperature and pressure needed for the fracturing fluid.

Accordingly, the disclosed system allows an operator 48 to operate the from inside the cab 19 or outside of the cab at some distance away from the unit with a remote access device 50, such as a portable computer, hand held device, phone or tablet. When the access device 50 is programmed to display the temperatures and pressures measured at locations, such as the coolant exit temperature 38 and the temperature of the cryogenic fluid at the system outlet manifold 15, the access device 50 will server as a computerized control panel 42. The computerized control panel 42 will allow the operator to control the disclosed system from within the cab or from outside of the cab, at some distance away from the unit. This arrangement allows an operator to use the computerized control panel 42 to observe and control specific flows, temperatures, or operating pressures of the fluids used in the system as may be needed. For example, an increase in the pressure of the heated nitrogen gas being delivered to the fracturing fluid will typically result in an increase in the hydraulic fluid temperature, which will then result in a reduction of the heat that needs to be transferred from the engine coolant 36. The disclosed system will be capable of providing automated adjustment of the flow of coolant or exhaust gases to the heat exchanger bank 20.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for heating cryogenic fluids, the system cooperating with a semi tractor for transporting a cryogenic fluid in a liquid state in a semi-trailer tanker, the semi tractor having a trailer coupling that is adapted for connecting the semi-trailer tanker to the semi tractor, so that the semi tractor tows the semi-trailer tanker with the cryogenic fluid, the semi tractor based system accepting the cryogenic fluid from the semi-trailer tanker and heating the cryogenic fluid from a cryogenic temperature to a superheated vapor state, so that the superheated vapor is available for use as a component of fracking fluid, the semi tractor having an internal combustion engine cooled by a liquid coolant, a cab section, and a frame with frame rails, the trailer coupling being mounted over the frame rails at a location between a rearmost axle of the semi tractor and the cab section, the coupling being adapted for accepting the semi-trailer tanker, the system comprising:

a support platform adapted for mounting from the frame rails of the semi tractor at a location between the trailer coupling and the cab section of the semi tractor;

a hydraulic fluid pumping system that is powered by the engine of the semi tractor, the hydraulic fluid pumping system including a hydraulic pump and a pressure relief valve, for increasing temperature of the pressurized hydraulic fluid through a rapid reduction of hydraulic fluid pressure;

a heat exchanger bank that accepts hydraulic fluid from the hydraulic fluid pressure relief valve, the exhaust gases from the internal combustion engine, and the coolant from the internal combustion engine as heat energy sources that heat the cryogenic fluid, so that the semi-trailer tanker may be towed to a fracking location by the semi tractor, and so that the heat from the flow of hydraulic fluid from the hydraulic fluid pressure relief valve, the exhaust gases from the internal combustion engine, and the coolant from the internal combustion engine is then made available for superheating the cryogenic fluid to a superheated vapor state while the tanker is attached to the trailer coupling, and so that the semi-trailer tanker may be removed from the trailer coupling that is accompanied with the platform and the cab section of the semi tractor.

* * * * *